United States Patent [19]

Hironaka et al.

[11] Patent Number: 5,669,731
[45] Date of Patent: Sep. 23, 1997

[54] COMPONENT RETAINING LEGS

[75] Inventors: Katsuhito Hironaka; Makoto Fukase, both of Okazaki, Japan

[73] Assignee: Daiwa Kasei Kogyo Kabushiki Kaisha, Aichi-ken, Japan

[21] Appl. No.: 619,793

[22] Filed: Mar. 20, 1996

[30] Foreign Application Priority Data

Sep. 19, 1995 [JP] Japan .................... 7-239989

[51] Int. Cl.⁶ ............................................ F16B 19/00
[52] U.S. Cl. ................... 403/405.1; 403/392; 403/397; 411/508; 411/510; 24/297
[58] Field of Search .................. 24/458, 297; 411/508, 411/509, 510, 913, 182; 403/405.1, 406.1, 407.1, 392, 384, 375, 108, 397

[56] References Cited

U.S. PATENT DOCUMENTS

| 2,424,757 | 7/1947 | Klumpp, Jr. ................ 411/510 X |
| 4,080,522 | 3/1978 | Schimmels .................. 411/182 X |
| 4,431,355 | 2/1984 | Junemann .................... 411/508 X |
| 4,644,614 | 2/1987 | Mizusawa ..................... 411/508 X |
| 4,712,341 | 12/1987 | Harris, Jr. et al. ............. 24/297 X |
| 4,787,795 | 11/1988 | Kraus ............................. 411/510 |
| 4,981,310 | 1/1991 | Belisaire ....................... 411/508 X |
| 5,111,557 | 5/1992 | Baum et al. .................... 24/297 X |
| 5,289,621 | 3/1994 | Kaneko .......................... 24/297 X |

Primary Examiner—Harry C. Kim
Attorney, Agent, or Firm—Dennison, Meserole, Pollack & Scheiner

[57] ABSTRACT

A component retaining leg is disclosed, which comprises a base to be provided on a component such as a clamp and a clip, a pillar depending from the base, and a flexible retaining piece extending from the free end of the pillar in a folded fashion toward the base. The free end of the retaining piece has an engagement step section for engaging a mounting hole of a panel. The engagement step section has a plurality of engagement steps formed at a predetermined interval.

2 Claims, 17 Drawing Sheets

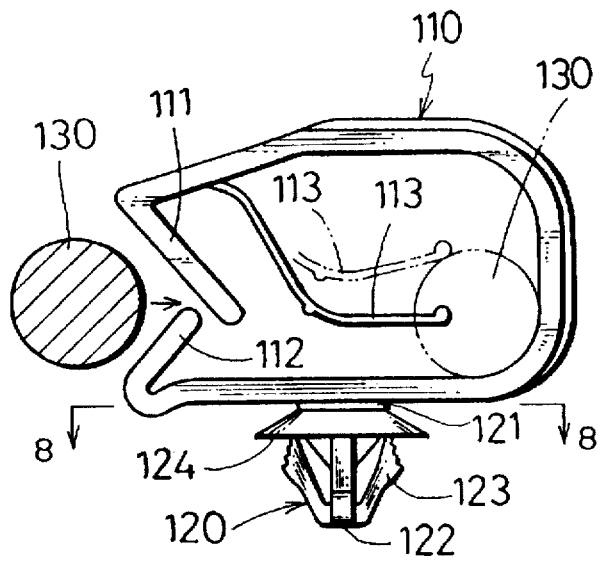
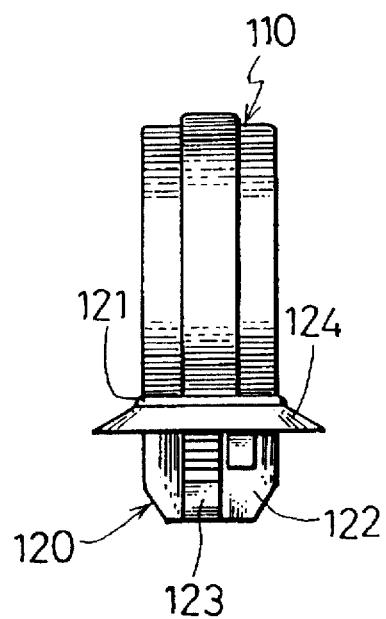
FIG.8(a)  FIG.8(b)
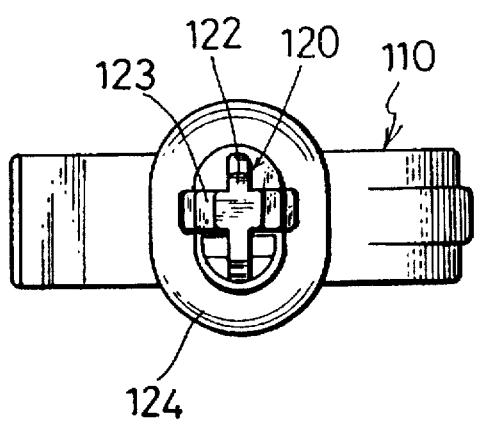
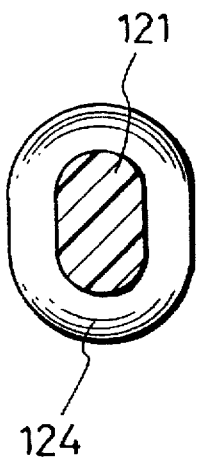
FIG.8(c)  FIG.8(d)

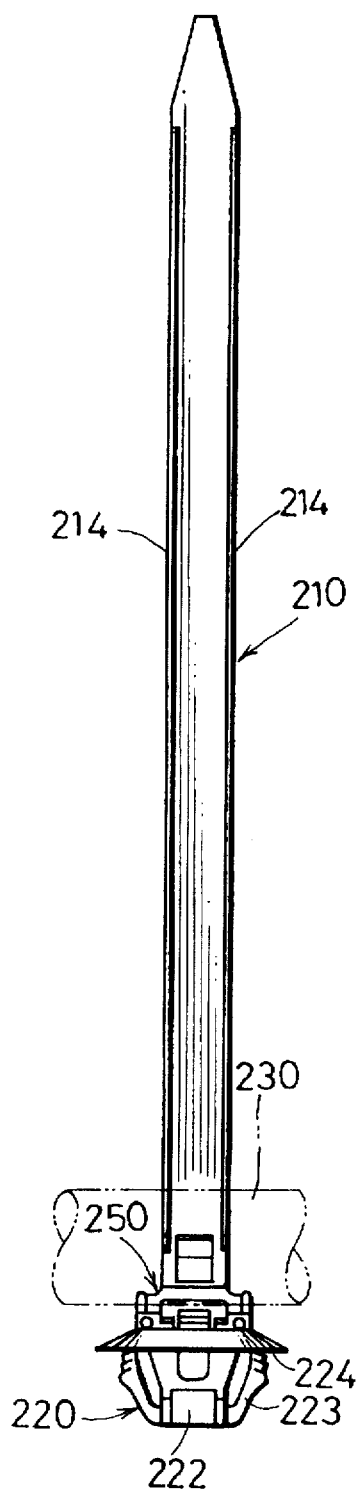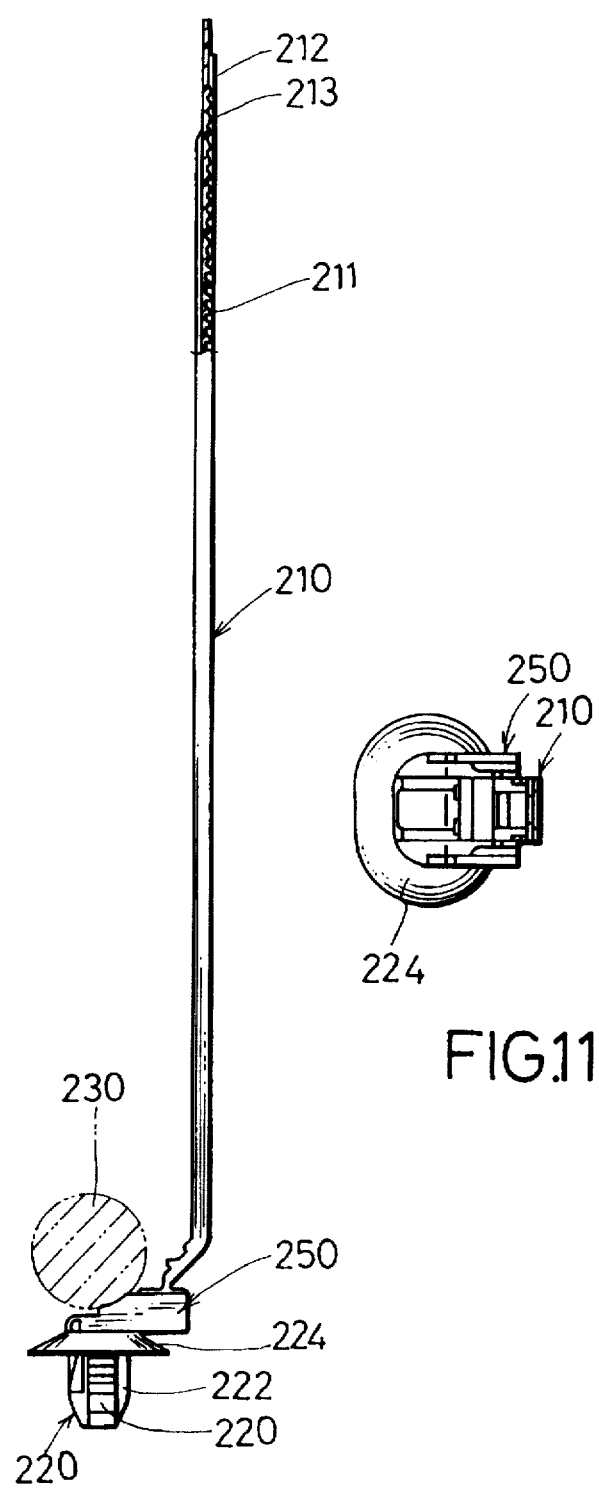
FIG.11(a) FIG.11(b) FIG.11(c)

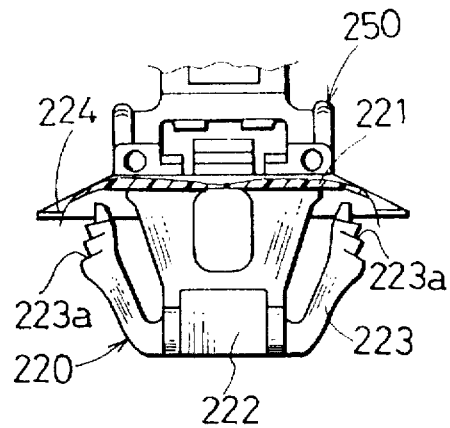
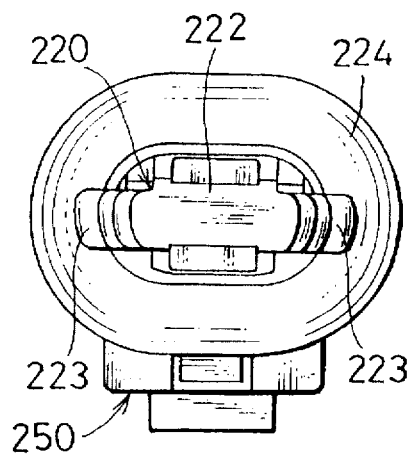
FIG.13(a)　　　　　FIG.13(b)
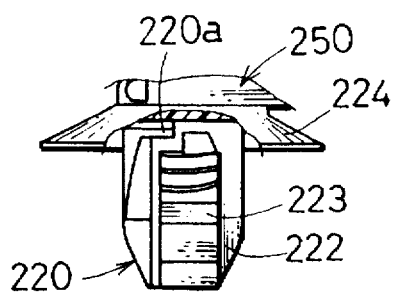
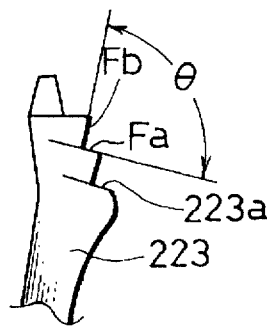
FIG.13(c)　　　　　FIG.13(d)
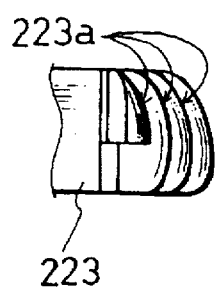
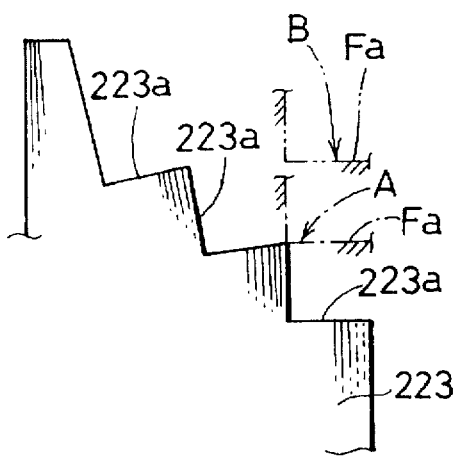
FIG.13(e)　　　　　FIG.13(f)

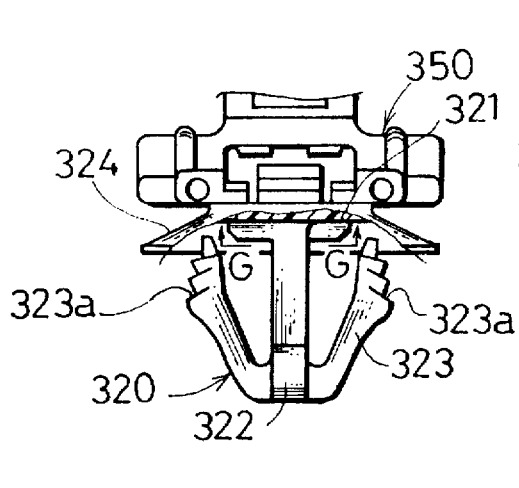
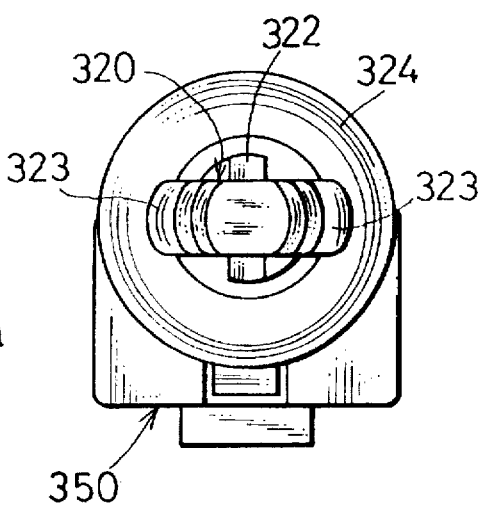
FIG.17(a)  FIG.17(b)
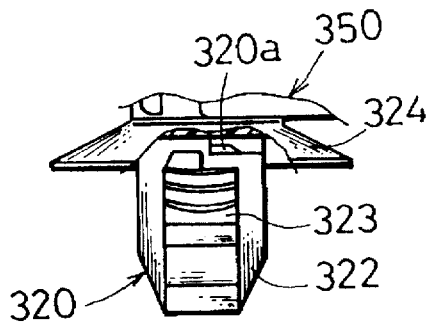
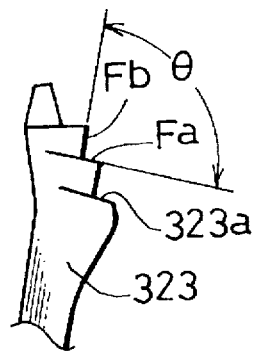
FIG.17(c)  FIG.17(d)
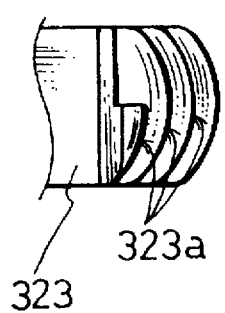
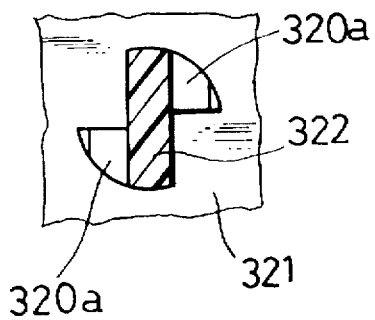
FIG.17(e)  FIG.17(f)

5,669,731

1

COMPONENT RETAINING LEGS

BACKGROUND OF THE INVENTION

1. Field of the Invention

This invention relates to component retaining legs for attaching clamps, clips or like components to panels such as automotive body panels.

2. Description of the Prior Art

An example of prior art component retaining leg is shown in the front view of FIG. 19. This retaining leg 80 is a molding of a synthetic resin, and comprises a base 81 to be provided on a clamp, a clip or like component, a pillar 82 depending from the base 81, and a pair of flexible retaining pieces 83 extending from the free end of the pillar 82 in a folded fashion toward the base 81. The retaining pieces 83 each have their free end formed with a single step or shoulder 83a to be engaged with the surface of a panel 84 adjacent a mounting hole 85 formed therein. As the retaining leg 80 is inserted through the mounting hole 85 of the panel 84, the retaining pieces 83 are caused by the mounting hole 85 to flex toward each other. When the retaining leg 80 is inserted until the base 81 engages the panel 84, the retaining pieces 83 are elastically restored so that the steps 83a are click engaged with the panel surface adjacent the mounting hole 85. Thus, the retaining leg 80 is attached, i.e., retained against detachment.

The prior art retaining leg 80 can be attached without rattling to a panel 84 which has a thickness t corresponding to, i.e., equal to, the distance between the base 81 and the step 83a. When the thickness t of the panel 84 is not fixed, however, the retaining leg 80 may be attached with rattling or can not be attached. To cope with variations of the thickness t of the panel 84, it is necessary to prepare a plurality of different retaining legs 80 each fitted to each panel thickness. In such case, time-consuming component management is required.

SUMMARY OF THE INVENTION

The invention seeks to solve the above problem, and it has an object of providing a component retaining leg which can be attached to panels having different thicknesses so that component management can be dispensed with.

The invention features a component retaining leg which comprises a base to be provided on a component such as a clamp and a clip, a pillar depending from the base, and a flexible retaining piece extending from the free end of the pillar in a folded fashion toward the base, the free end of the retaining piece having an engagement step section for engaging a mounting hole of a panel, the engagement step section having a plurality of engagement steps formed at a predetermined interval.

As the component retaining leg according to the invention is inserted through a mounting hole of a panel, the retaining pieces are caused by the mounting hole to flex toward each other, and when the base engages the panel, the retaining pieces are elastically restored so that their engagement step sections engage the mounting hole. Thus, the retaining leg is attached and retained against detachment.

Since each engagement step section has a plurality of engagement steps, it is possible to eliminate rattling or disability of attachment of the retaining leg irrespective of the panel thickness, and the retaining leg can be adequately attached to the panel.

2

Figure 2:
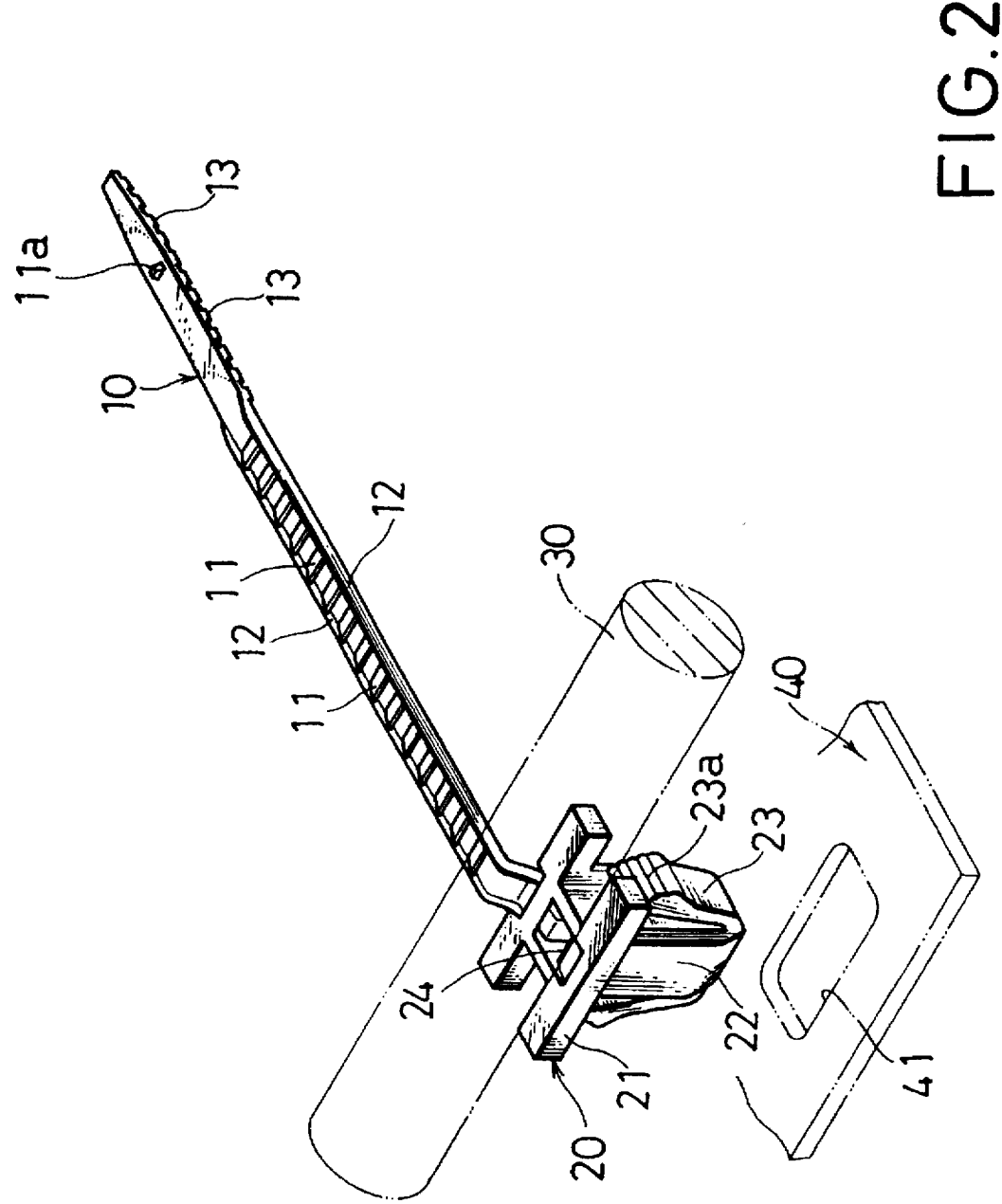
Figure 3:
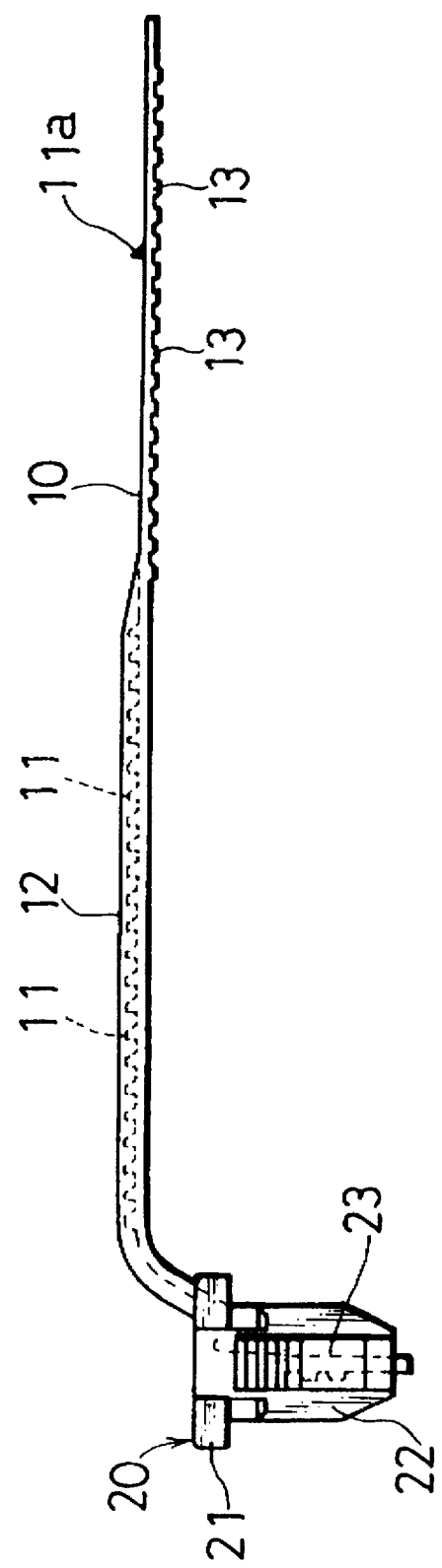
Figure 4:
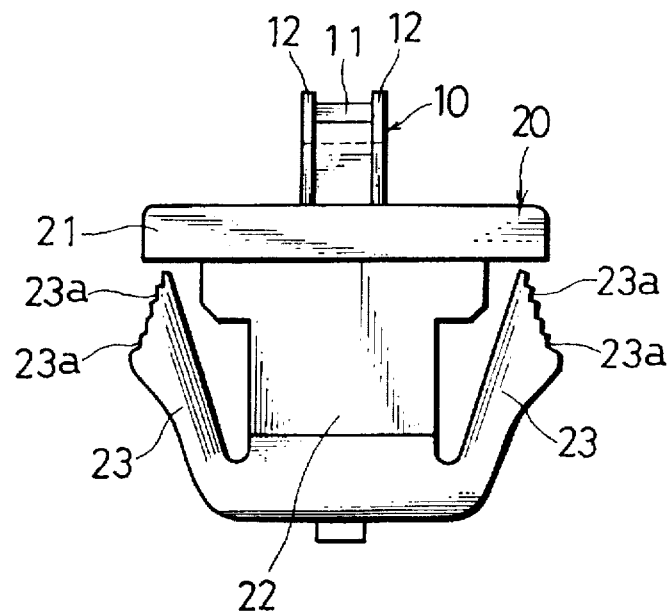
Figure 5:
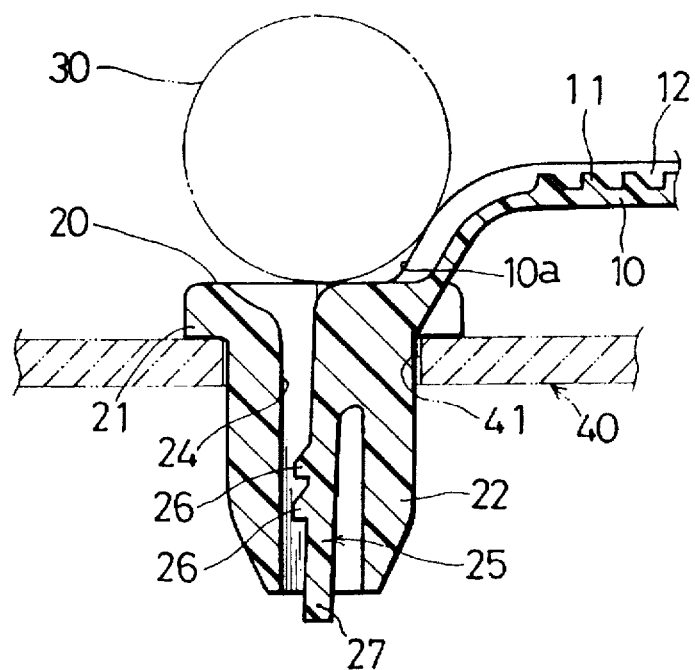
Figure 6:
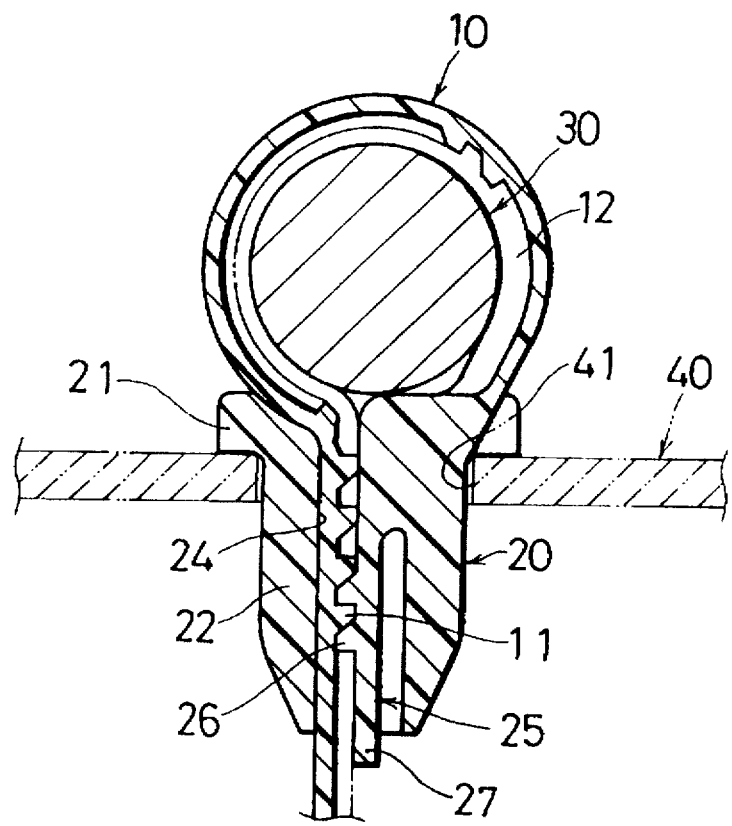
Figure 7:
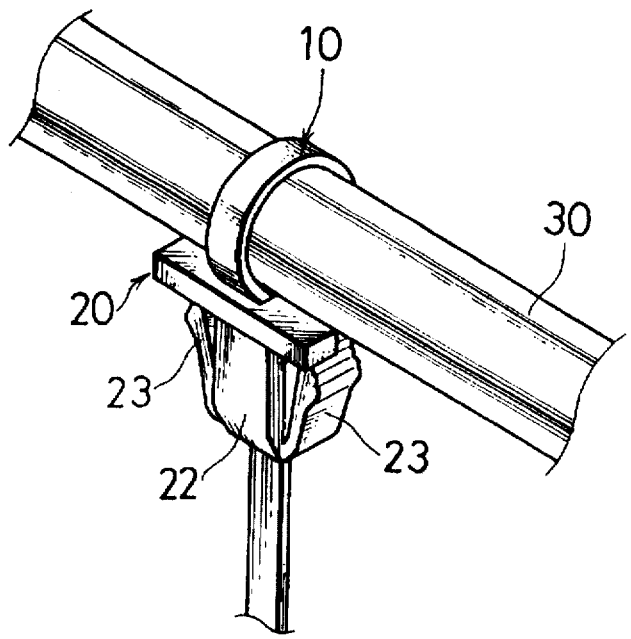
Figure 10A:
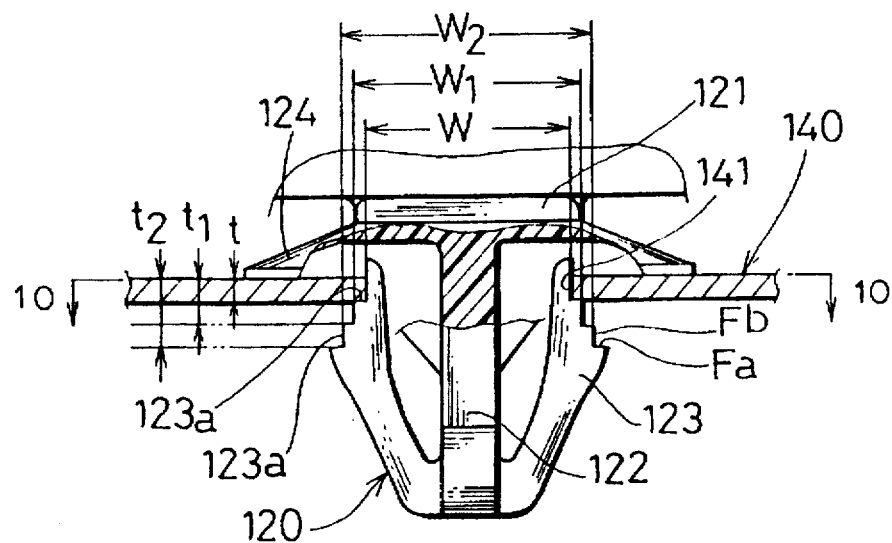
Figure 10B:
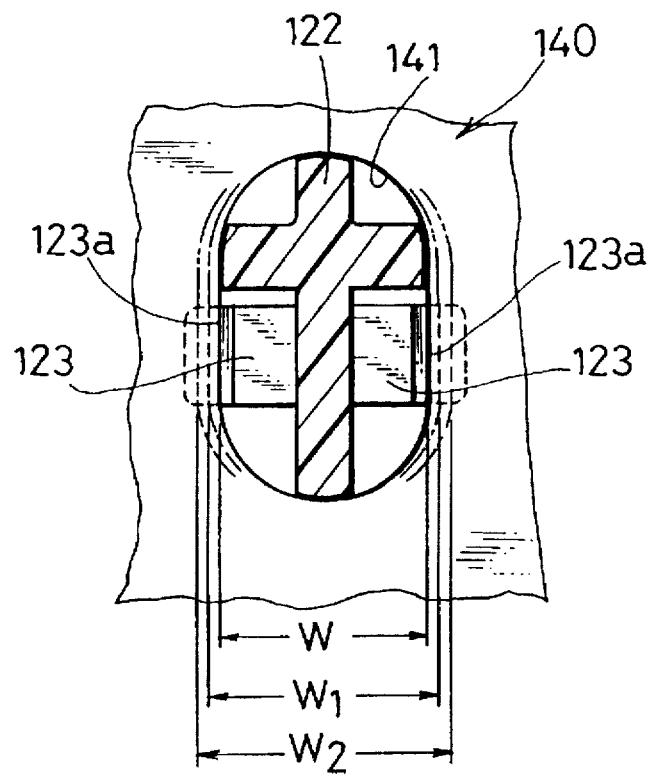
Figures 12A, 12B:
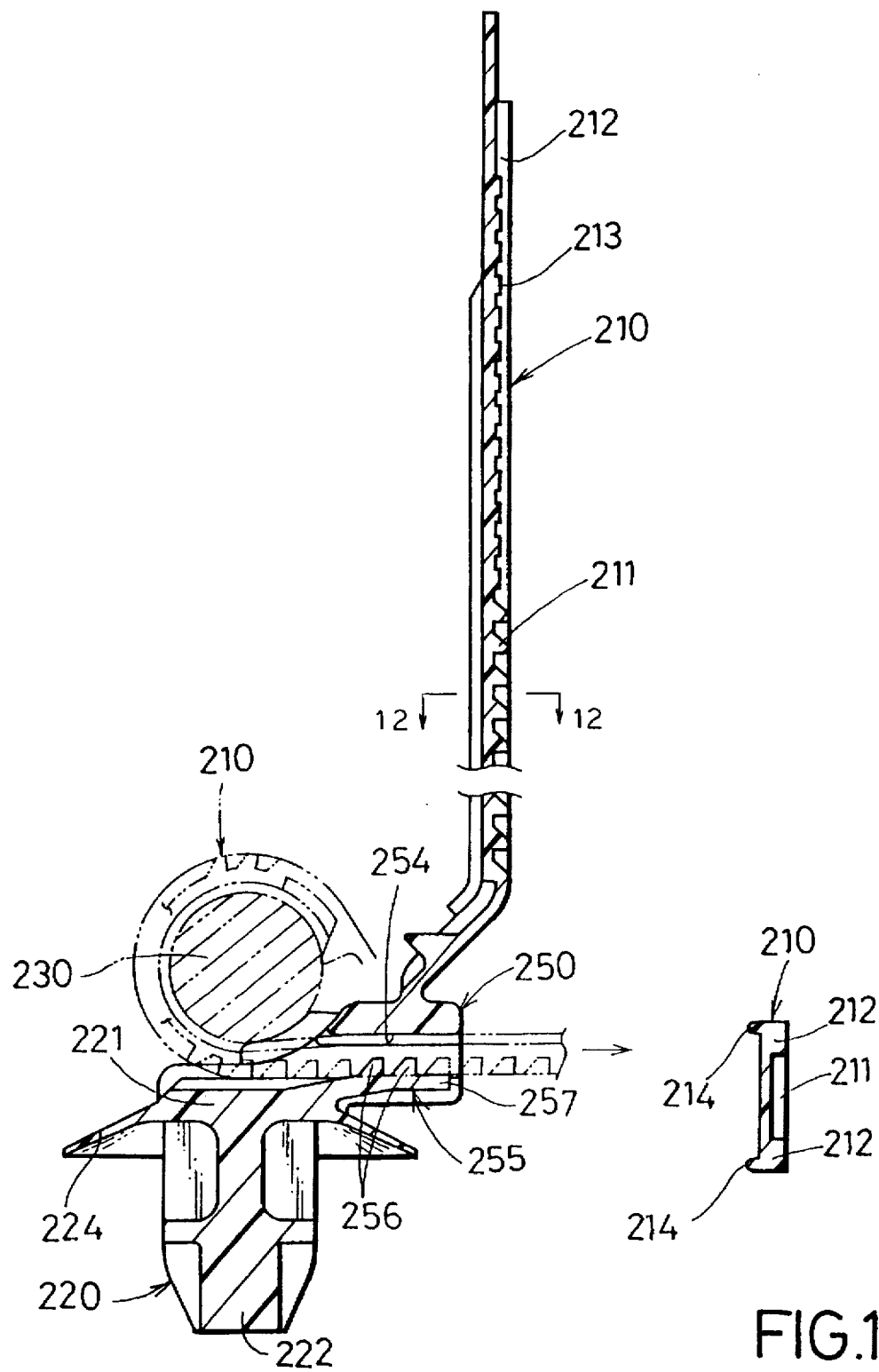
Figures 15A, 15B, 15C:
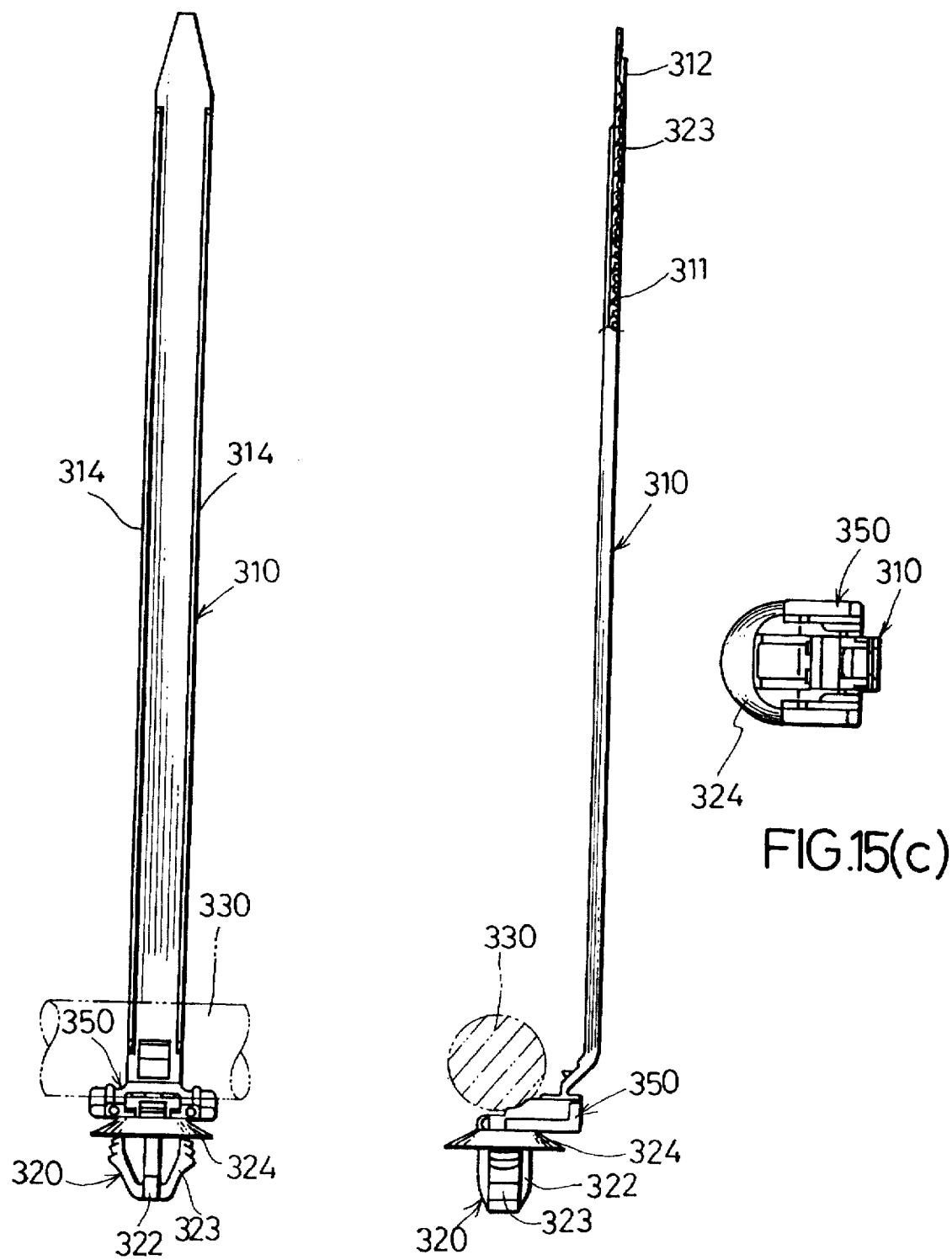
Figures 16A, 16B:
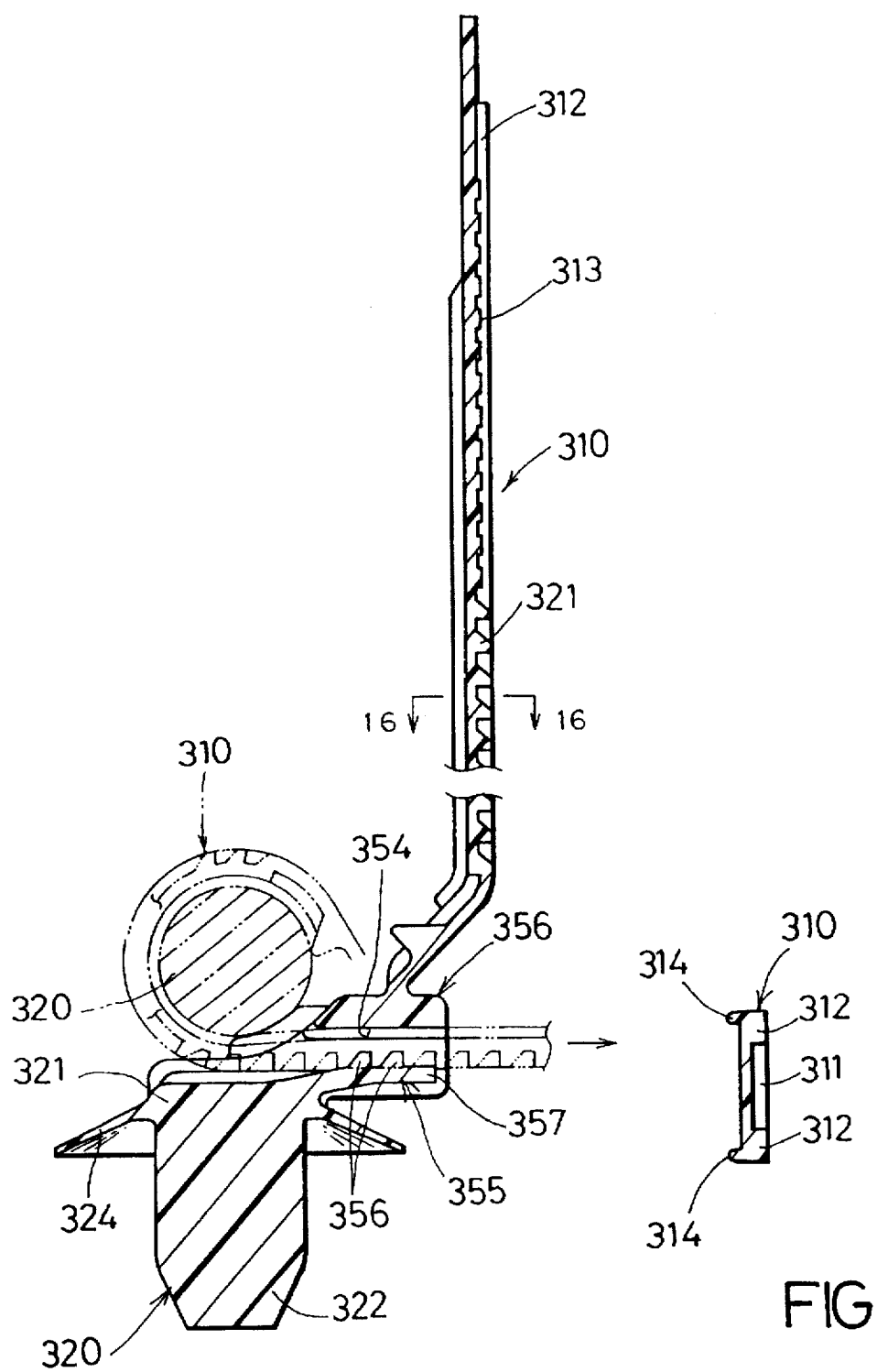
Figure 18A:
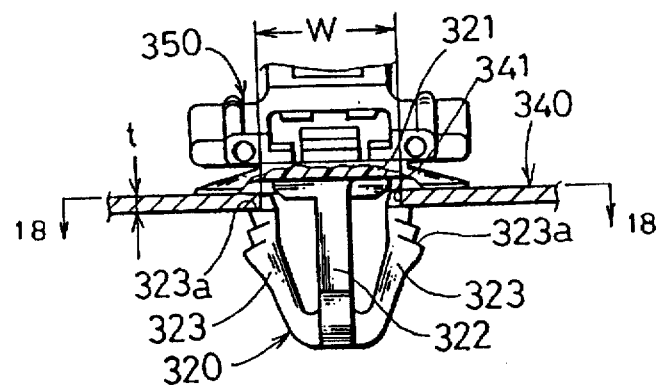
Figure 18B:
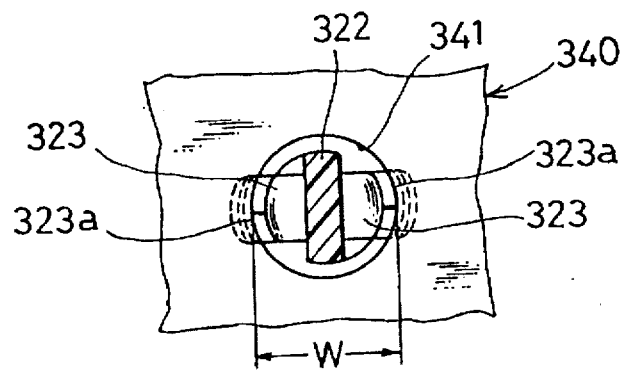
Figures 18C, 18D:
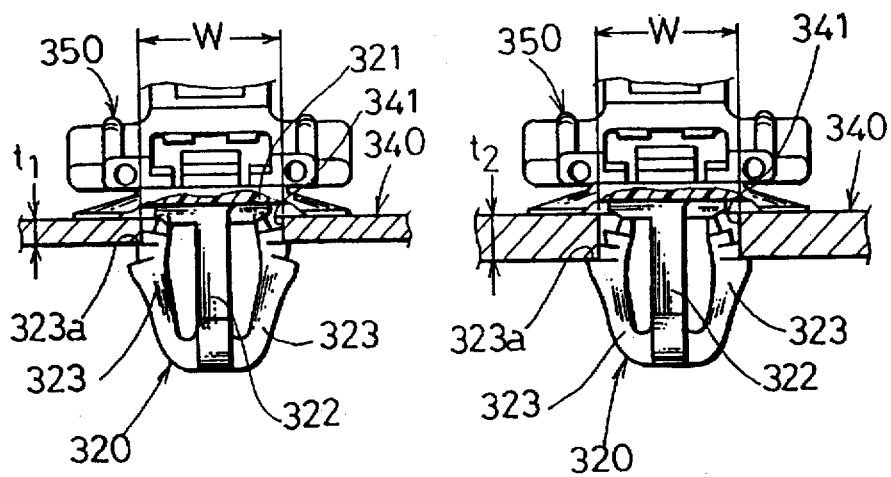
Figure 19:
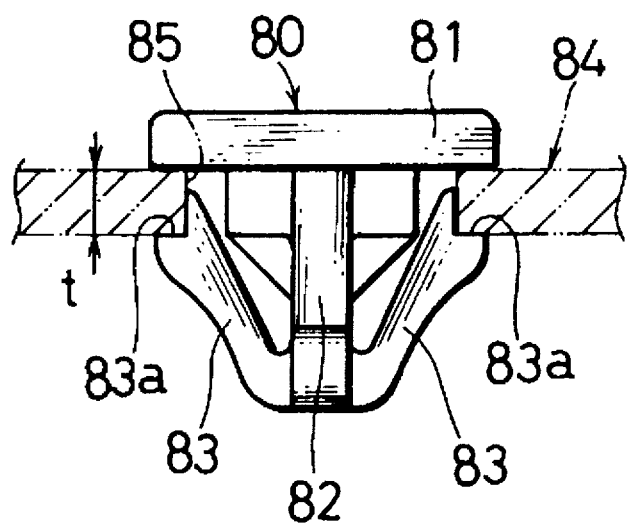

FIG. 2 is a perspective view showing a belt clamp with the retaining leg;

FIG. 3 is a side view showing the same belt clamp;

FIG. 4 is a front view showing the same belt clamp;

FIG. 5 is a sectional view showing the retaining leg of the same belt clamp;

FIG. 6 is a sectional view showing the belt clamp in a state in which an object is bound;

FIG. 7 is a perspective view showing the same belt clamp;

FIGS. 8(a) to 8(d) illustrate a clamp with a retaining leg of a second embodiment;

FIGS. 9(a) to 9(d) are views showing the same retaining leg;

FIGS. 10(a) and 10(b) showing the same retaining leg in an attached state;

FIGS. 11(a) to 11(c) are views showing a belt clamp with a retaining leg of a third embodiment;

FIGS. 12(a) and 12(b) are sectional views showing the same belt clamp;

FIGS. 13(a) to 13(f) are views showing the retaining leg of the same belt clamp;

FIGS. 14(a) to 14(d) are views showing the same retaining leg in an attached state;

FIGS. 15(a) to 15(c) are views showing a belt clamp with a retaining leg of a fourth embodiment;

FIGS. 16(a) and 16(b) are sectional views showing the same belt clamp;

FIGS. 17(a) to 17(f) are views showing the retaining leg of the same belt clamp;

FIGS. 18(a) to (d) are views showing the same retaining leg in an attached state; and FIG. 19 is a view showing a prior art retaining leg.

DETAILED DESCRIPTION OF THE PREFERRED EMBODIMENTS

Preferred embodiments of the invention will now be described.

First Embodiment

A first embodiment will now be described with reference to FIGS. 1(a) to 7. The retaining leg of the first embodiment is applied to a belt clamp for an automotive wire harness.

FIG. 2 is a perspective view showing the belt clamp, FIG. 3 is a side view showing the same, and FIG. 4 is a front view showing the same. As shown in these drawings, the belt clamp is a one-piece molding of a synthetic resin, and mainly comprises a flexible belt 10 and a retaining leg 20 joined to the belt 10 and serving as a buckle.

The inner surface (or upper surface) of the belt 10 on the winding side, has a plurality of engagement teeth 11 formed in a row at a predetermined interval in the longitudinal direction and also has ribs 12 formed along the opposite sides of the engagement teeth row. The winding side surface of an end portion of the belt 10 has a temporary engagement tooth 11a, and the opposite surface (or inner surface) of the same end portion has a plurality of anti-slip protuberances 13 formed in a row at a predetermined interval in the longitudinal direction. The retaining leg 20 to which a stem of the belt 10 is joined as shown in the front view of FIG. 1(a), can be substantially coaxially mounted in a mounting hole 41 of a panel 40, and it comprises a base 21, a pillar 22 depending therefrom, and a pair of flexible retaining pieces 23 extending from the free end of the leg 22 in a folded fashion toward the base 21.

The free end of each retaining piece 23 has an engagement step section 23a to be engaged with the mounting hole 41 of the panel 40. The engagement step section 23a has a plurality of (five in the drawing) steps, as shown in the enlarged-scale view of FIG. 1(b).

Figure 1A:
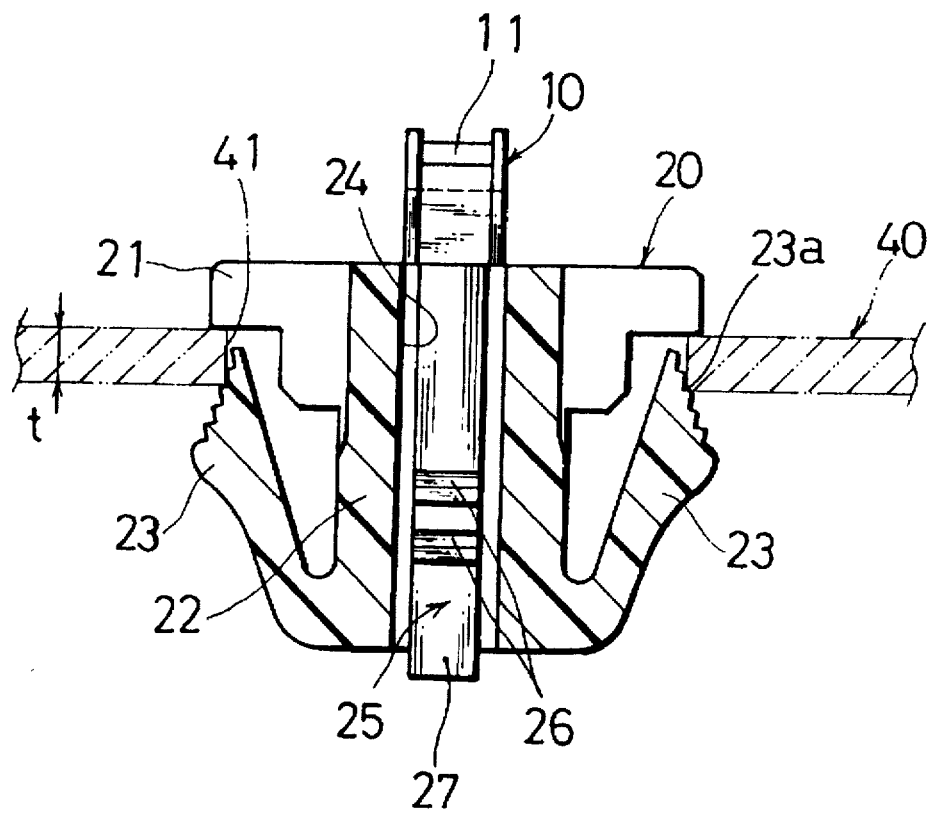
FIGS. 1(a) and 1(b) are views illustrating a retaining leg according to a first embodiment of the invention.

Referring to FIG. 5, i.e., a sectional view showing the retaining leg 20, in addition to FIG. 1(a), the pillar 22 of the retaining leg 20 has an axial through bore 24 through which the belt 10 is inserted from its leading end. The retaining leg 20 further comprises a flexible engagement piece 25 which extends downward from an upper end portion of the wall surface of the through hole 24 that is joined to the belt 10. The engagement piece 25 has two engagement protuberances 26 which can engage the engagement teeth 11 of the belt 10. With elastic deformation of the engagement piece 25, the engagement protuberances 26 permit passage of the engagement teeth 11 when tightening the belt 10, but they block passage of the teeth 11 in the reverse direction, i.e., they retain the belt 10 against passage in the reverse direction. The engagement piece 25 has an engagement release piece 27 formed at the free end thereof and projecting from the lower end of the pillar 22. The engagement release piece 27 can be operated to cause flexing of the engagement piece 25 so as to release the engagement between the engagement protuberances 26 and the engagement teeth 11.

A case of binding an object (for instance, a wire harness) with the above belt clamp will now be described. The base 21 of the retaining leg 20 is held in a position to bundle an object 30, as shown by broken lines in FIG. 5. Then, the belt 10 is wound on the object 30, and the leading end of the belt 10 is inserted through the through hole 24 so that it projects downward from the retaining leg 20. At this time, the temporary engagement tooth 11a of the belt 10 clears the engagement protuberances 26 with elastic deformation of the engagement piece 25, so that the belt 10 is tied to the retaining leg 20 and retained against detachment.

Afterwards, the object 30 is tightly bound by pulling the end of the belt 10 that projects downward from the retaining leg 20 with fingers. As a result, the engagement teeth 11 of the belt 10 are caused to clear the engagement protuberances 26 with elastic deformation of the engagement piece 25. At the end of the pulling, the engagement protuberances 26 are engaged with corresponding engagement teeth 11, so that the binding of the object 30 is completed. The resultant bound state of the object 30 is shown in a sectional view in FIG. 6 and in a perspective view in FIG. 7.

When tightly binding the object 30, all the anti-slip protuberances 13 provide a function of preventing the slip of fingers. When it becomes necessary to re-bind the object 30, the engagement of the engagement protuberances 26 with the engagement teeth 11 is released by operating the engagement release piece 27. By so doing, it is possible to loosen the belt 10 or take the belt 10 out through the through hole 24.

Thereafter, the retaining leg 20 is inserted through the mounting hole 41 of the panel 40. As the retaining leg 20 is inserted through the mounting hole 41, the retaining pieces 23 are caused to flex toward each other by the edge of the mounting hole 41. When the base 21 comes to engage the panel 40, the retaining pieces 23 are elastically restored so that a step in each of their engagement step sections 23a that corresponds to the thickness t of the panel 40 engages the mounting hole 41, so that the retaining leg 20 is attached and retained against detachment. With the retaining leg 20 attached in the mounting hole 41 in this way, the object 30 is bound and clamped to the panel 40.

Figure 1B:
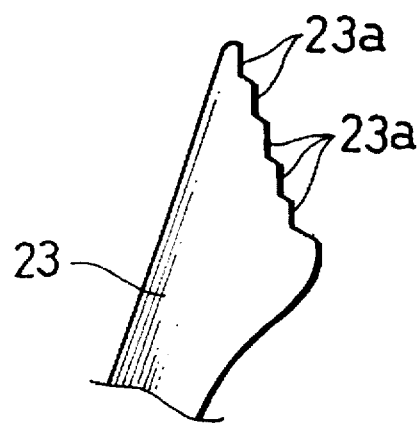

With the above retaining leg 20, since the free end of each retaining piece 23 has the engagement step section 23a having a plurality of steps, as shown in FIGS. 1(a) and 1(b), a step corresponding to the thickness t of the panel 40 engages the mounting hole 41. That is, it is possible to eliminate rattling or disability of attachment of the retaining leg 20 irrespective of the panel thickness, and the retaining leg 20 can be adequately attached to the panel 40. A single kind of retaining leg 20 thus can be adequately attached to panels 40 having different thicknesses t, and time-consuming component management is unnecessary.

Second Embodiment

A second embodiment will now be described with reference to FIGS. 8(a) to 10(b). The retaining leg of the second embodiment is applied to a clamp for an automotive wire harness.

FIGS. 8(a) to 8(d) illustrate the clamp. FIG. 8(a) is a front view, FIG. 8(b) is a right side view, FIG. 8(c) is a bottom view, and FIG. 8(d) is a sectional view taken along line 8—8 in FIG. 8(a). As shown in FIGS. 8(a) to 8(c), the clamp is a one-piece molding of a synthetic resin, and it mainly comprises a substantially C-shaped flexible clamp portion 110, and a retaining leg 120 depending from the underside of the clamp portion 110.

The clamp portion 110 has upper and lower folded guide portions 111 and 112, and also has a pushing piece 113 extending downward from the upper end portion thereof.

Figure 9A:
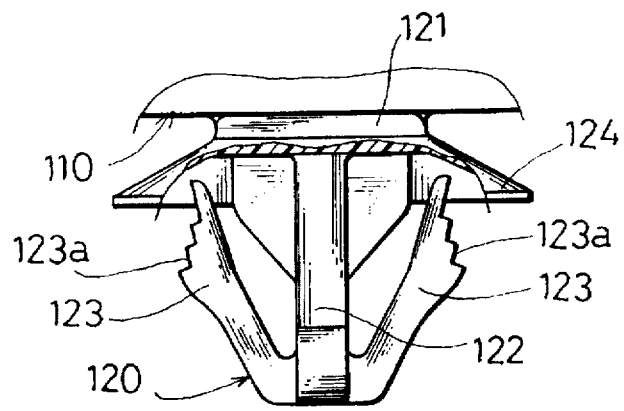
Figures 9B, 9C:
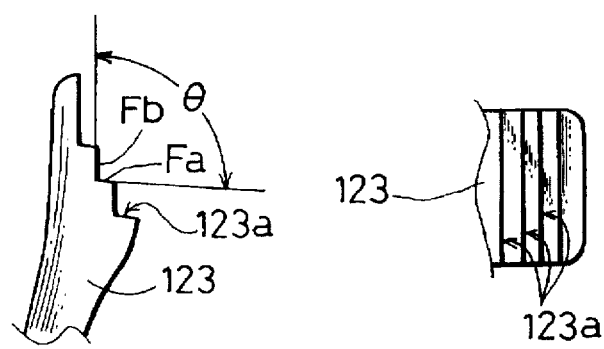
Figure 9D:
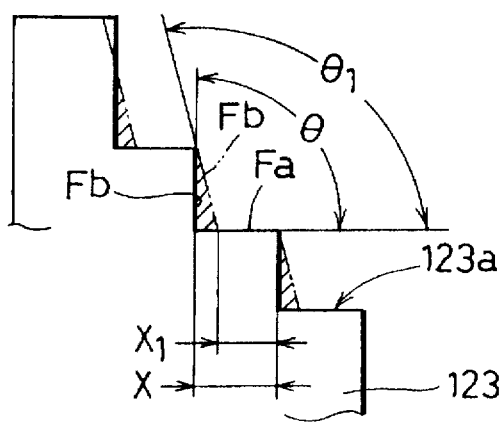

FIGS. 9(a) to 9(d) show the retaining leg 120 depending from the underside of the clamp portion 110. FIG. 9(a) is a partly broken-apart front view, FIG. 9(b) is an enlarged-scale view showing an engagement step section, FIG. 9(c) is a plan view showing the same, and FIG. 9(d) is a view for describing the engagement step section. As shown in FIG. 9(a), the retaining leg 120 comprises a base 121, a pillar 122 depending therefrom, and a pair of flexible retaining pieces 123 extending from the free end of the pillar 122 in a folded fashion toward the base 121. The base 121 is substantially oval in plan view, as shown in FIG. 8(d), and has a substantially dish-like stabilizer 124 formed on the bottom thereof, as shown in FIGS. 8(a) to 8(c).

The free end of each of the retaining pieces 123 has an engagement step section 123a to engage the mounting hole 141 of a panel 140 which will be described later. As shown in FIGS. 9(b) and 9(c), each engagement step section 123a has a plurality of (three in the drawing) steps. The mounting hole 141 of the panel 140 is substantially oval, as shown in FIGS. 10(a) and 10(b) for describing the state of attachment of the retaining leg 120. FIG. 10(a) is a partly broken-away front view, and FIG. 10(b) is a sectional view taken along line 10—10 in FIG. 10(a).

Referring to FIGS. 10(a) and 10(b), in the second embodiment, the engagement step sections 123a engage straight portions of the mounting hole 141 of the panel 140 in the major diametrical direction of the mounting hole 141. The engagement step sections 123a are straight in the width direction of the retaining pieces 123.

As shown in FIG. 9(b), the angle θ between each step or engagement face Fa of the engagement step section 123a that substantially faces the back surface of the panel 140 and the associated engagement face Fb that substantially faces the wall surface of the mounting hole 141 of the panel 140, is set substantially to 90° (97°, for instance, as shown in the drawing). Each engagement face Fa is formed in a plane substantially at right angles to the center line of the retaining piece 123, and the engagement faces Fb are substantially parallel to one another.

As shown in FIGS. 10(a) and 10(b), each engagement face Fa of each engagement step section 123a is formed such that it is parallel to the back surface of the panel 140 having a thickness t, $t_1$ or $t_2$ when each engagement step section 123a is engagement with the mounting hole 142 having a width W, $W_1$ or $W_2$.

A case of binding an object (for instance, a wire harness) with the above clamp will now be described. As shown in FIG. 8(a), the guide portions 111 and 112 are held in position to bundle an object 130, and the object 130 is then pushed into the clamp portion 110 by making use of the elasticity of the clamp portion 110 so that it is clamped with the elasticity of the pushing piece 113 as shown by broken lines in the drawing.

Then, as shown in FIGS. 10(a) and 10(b), the retaining leg 120 is inserted through the mounting hole 141 of the panel 140. As the retaining leg 120 is inserted through the mounting hole 141, the retaining pieces 123 are caused to flex toward each other by the edge of the mounting hole 141. When the base 121 comes to engage the panel 140, a step in each engagement step section 123a corresponding to thickness t, $t_1$ or $t_2$ of the panel 140 engages the mounting hole 141 having width W, $W_1$ or $W_2$, so that the retaining leg 120 is attached and retained against detachment. With the attachment of the retaining leg 120 in position in the mounting hole 141, the object 130 is bound and clamped to the panel 140. The stabilizer 124 is held in elastic contact with the surface of the panel 140.

Thus, the retaining leg 120 can be adequately attached to the panel 140 irrespective of the thickness thereof because a step in the engagement step section 123a that corresponds to the panel thickness t, $t_1$ or $t_2$ engages the mounting hole 141 having the width W, $W_1$ or $W_2$. That is, it is possible to eliminate rattling or disability of attachment of the retaining leg 120. In addition, a single kind of retaining leg 120 can be adequately attached to a plurality of panels 140 having different thicknesses, and time-consuming component management is unnecessary.

As a further advantage, since with the retaining leg 120, the angle θ between the step or engagement face Fa of each engagement step section 123a and the associated engagement face Fb is set substantially to 90°, it is possible to provide an increased contact area of the engagement face Fa of the engagement step section 123a with respect to the panel 140. This will be described with reference to FIG. 9(d). When the angle $θ_1$ between the engagement faces Fa and Fb is set to 115° as shown by broken lines, i.e., with angle $θ_1$, the contact area of the engagement face Fa is $X_1$. With angle θ, the contact area X of the engagement face Fa includes the shaded area and is thus greater than the contact area $X_1$. An increased retention force of the retaining leg 120 with respect to the panel 140 thus can be obtained. The angle θ is suitably 90° or around 90°, for instance in a range of 90° to 98°.

As a still further advantage of the retaining leg 120, when the engagement step sections 123a engage the mounting hole 141 of the panel 140 with thickness t, $t_1$ or $t_2$, the prevailing engagement face Fa of the engagement step section 123a is parallel to the back surface of the panel 140, and thus the engagement face Fa of the engagement step section 123a properly engages the panel 140.

The retaining leg 120 can be attached in position in mounting holes 141 having a fixed width of panels 140 having different thicknesses t, $t_1$ and $t_2$.

Third embodiment

A third embodiment will now be described with reference to FIGS. 11(a) to 14(d). The retaining leg of the third embodiment is again applied to a belt clamp for an automotive wire harness.

FIGS. 11(a) to 11(c) show the belt clamp. FIG. 11(a) is a front view, FIG. 11(b) is a partly broken-away right side view, and FIG. 11(c) is a plan view. FIG. 12(a) is a sectional view showing the belt clamp, and FIG. 12(b) is a sectional view taken along line 12—12 in FIG. 12(a).

As shown in FIGS. 11(a) to 12(b), the belt clamp is a one-piece molding of a synthetic resin, and it mainly comprises a flexible belt 210, a buckle 250 joined to the belt 210, and a retaining leg 220 joined to the buckle 250.

The outer surface (or back surface) of the belt 210 on the winding side, has a plurality of engagement teeth 211 formed in a row at a predetermined interval in the longitudinal direction and also has ribs 212 formed along the opposite sides of the engagement teeth row. The inner surface (i.e., front in the drawing) of the belt 210 on the winding side, has ribs 214 formed along the opposite edges. The outer surface of an end portion of the belt 210 has a plurality of anti-slip protuberances 213 formed in a row at a predetermined interval in the longitudinal direction.

The buckle 250 joined to the stem of the belt 210, as shown in FIG. 12(a), has a longitudinal through hole 254 through which the belt 210 is inserted. An engagement piece 255 extends rearward from a front portion of the lower wall surface of the through hole 254. The engagement piece 255 has two engagement protuberances 256 capable of engaging the engagement teeth 211 of the belt 210. With elastic deformation of the engagement piece 255, the engagement protuberances 256 permit passage of the engagement teeth 211 when tightening the belt 210, but they block passage of the engagement teeth 211 in the reverse direction. The engagement piece 255 has an engagement release piece 257 formed at the free end thereof. The engagement release piece 257 can be operated to cause flexing of the engagement piece 255 so as to release engagement of the engagement protuberances 256 and the engagement teeth 211.

FIGS. 13(a) to 13(f) show the retaining leg 220 depending from the buckle 250. FIG. 13(a) is a partly broken-away front view, FIG. 13(b) is a bottom view, FIG. 13(c) is a right side view, FIG. 13(d) is an enlarged-scale view showing an engagement step section, FIG. 13(d) is a plan view showing the engagement step section shown in FIG. 13(d), and FIG. 13(f) is a view for describing the engagement step section. As shown in FIGS. 13(a) to 13(c), the retaining leg 220 comprises a base 221 having a substantially oval shape in plan view, a pillar 222 depending form the base 221, and a pair of flexible retaining pieces 223 extending from the free end of the pillar 222 in a folded fashion toward the base 221. The base 221 has a substantially dish-like stabilizer 224 formed on the bottom thereof.

Figure 14A:
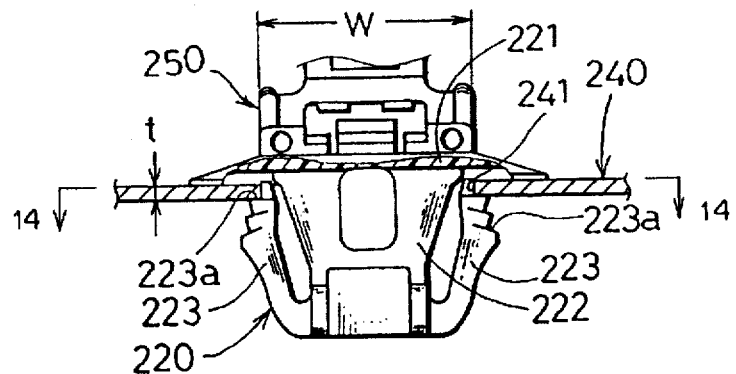
Figure 14B:
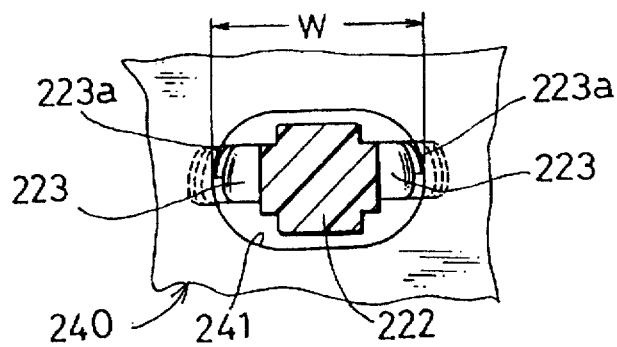
Figures 14C, 14D:
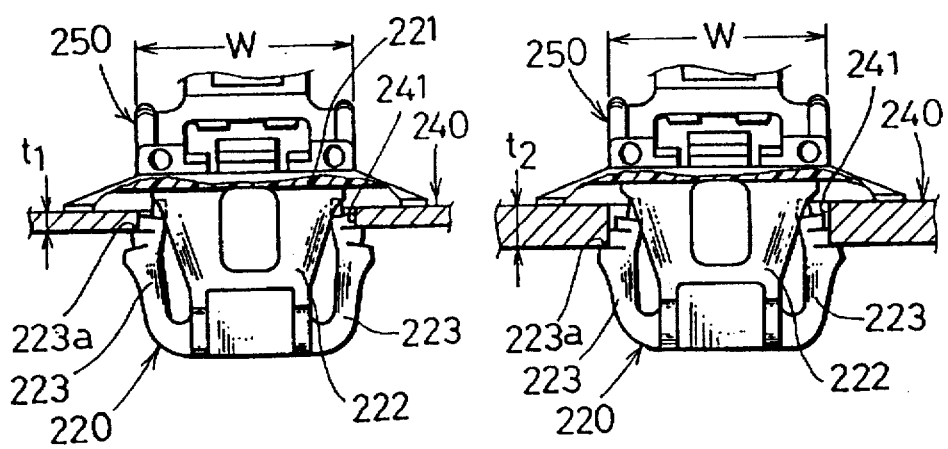

The free end of each of the retaining pieces 223 has an engagement step section 223a to engage a mounting hole 241 of a panel 240 which will be described later. As shown in FIGS. 13(d) and 13(e), each engagement step section 223a has a plurality of (three in the drawing) steps. The mounting hole 241 of the panel 240 is oval, as best shown in FIGS. 14(a) to 14(d) for describing the state of attachment of the retaining leg 220. FIG. 14(a) is a partly broken-away front view showing the state of engagement of the uppermost one of the steps of the engagement step section 223a, FIG. 14(b) is a sectional view taken along line 14—14 in FIG. 14(a), FIG. 14(c) is a partly broken-away front view showing the state of engagement of the intermediate one of the steps of the engagement step section 223a, and FIG. 14(d) is a partly broken-away front view showing the state of engagement of the lowermost one of the steps of the engagement step section 223a.

Referring to FIGS. 14(a) to 14(d), in the third embodiment, the engagement step sections 223a engage arcuate portions of the mounting hole 241 of the panel 240 extending at right angles to the longitudinal direction of the mounting hole 241. The engagement step sections 223a are arcuate in the width direction of the retaining pieces 223.

As with the second embodiment, the angle θ between each step or engagement face Fa of the engagement step section 223a that substantially faces the back surface of the panel 240 and the associated engagement face Fb that substantially faces the wall surface of the mounting hole 241 of the panel 240, is set substantially to 90°, as shown in FIG. 13(d).

As shown in FIGS. 13(c) and 13(e), the retaining pieces 223 each have their end portion partly cut away lest they should interfere with a pertinent portion (shown at 220a) of the retaining leg 220 when they are flexed.

As shown in FIGS. 14(a) to 14(d), each engagement face Fa of each engagement step section 223a is formed such that it is parallel to the back surface of the panel 240 having a thickness t, $t_1$ or $t_2$ when each engagement step section 223a is in engagement with the mounting hole 241 having a fixed width W. More specifically, in this embodiment, as shown in FIG. 13(f), assuming the position of engagement of the lowermost one of the steps of the engagement step section 223a to be as shown by solid line, the position of engagement of the intermediate one of the steps of the engagement step section 223a is as shown by a single dot broken line (labeled A), and the position of engagement of the uppermost one of the steps of the engagement step section 223a is as shown by a double dot broken line (labeled B). In this way, the inclination of the retaining pieces 223 is changed in dependence on the step that is in engagement. From the consideration of the inclinations of the retaining pieces 223 in the states of engagement of the individual steps, each engagement face Fa of each engagement step section 223a is formed such that it is parallel to the back surface of the panel 240 having a thicknesses t (see FIGS. 14(a) and 14(b)), $t_1$ (see FIG. 14(c)), or $t_2$ (see FIG. 4(d)), when the engagement step section 223a is in engagement with the mounting hole 241 having a fixed width W.

A case of binding an object (for instance, a wire harness) with the above belt clamp will now be described. As shown by double dot broken lines FIGS. 11(a) and 11(b), the buckle 250 is held to face an object 230 to be bound. Then, the belt 210 is wound on the object 230, and the end portion of the belt 210 is inserted through the through hole 254 so that it projects rearwardly of the buckle 250. Then, the object 230 is tightly bound by pulling the end portion of the belt 210 with fingers. By so doing, the engagement teeth 211 of the belt 210 are caused to clear the engagement protuberances 256 with elastic deformation of the engagement piece 255. When the tightening is completed, the engagement protuberances 256 engage corresponding engagement teeth 211, thus completing the binding of the object 230 (see double dot broken lines in FIG. 12(a)). While the object 230 is tightly bound, the anti-slip protuberances 213 provide a function of stopping the slip of fingers. When it becomes necessary to re-wind the object 230, the engagement between the engagement protuberances 256 and the engagement teeth 211 is released by operating the engagement release piece 257. By so doing, it is possible to loosen the belt 210 or take the belt 210 through the through hole 254.

Thereafter, the retaining leg 220 is inserted through the mounting hole 241 of the panel 240. As the retaining leg 220 is inserted through the mounting hole 241, the retaining pieces 223 are caused to flex toward each other by the mounting hole 241. When the base 221 comes to engage the panel 240, the retaining pieces 223 are elastically restored so that a step in each engagement step section 223a that corresponds to the thickness t, $t_1$ or $t_2$ of the panel 240 engages the mounting hole 241, so that the retaining leg 220 is attached and retained against detachment (see FIGS. 14(a) to 14(d)). With the retaining leg 220 attached in position in the mounting hole 241, the object 230 is bound and clamped to the panel 240. The stabilizer 224 elastically engages the surface of the panel 240.

Thus, the retaining leg 220 can be adequately attached to the panel 240 irrespective of the thickness thereof because a step in the engagement step section 223a that corresponds to the panel thickness t, $t_1$ or $t_2$ engages the mounting hole 241. That is, it is possible to eliminate rattling or disability of attachment of the retaining leg 220. In addition, a single kind of retaining leg 220 can be adequately attached to a plurality of panels 240 having different thicknesses, and time-consuming component management is unnecessary.

As a further advantage, like the second embodiment, since with the retaining leg 220, the angle θ between the engagement faces Fa and Fb of the engagement step section 223a is substantially set to 90°, it is possible to provide an increased contact area of the engagement face Fa of the engagement step section 223 with respect to the panel 240, thus permitting increase of the retaining force of the retaining leg 220 with respect to the panel 240.

As a still further advantage of the, retaining leg 220, like the second embodiment, when each engagement step section 223a engages the mounting hole 241 of the panel 240 with thickness t, $t_1$ or $t_2$, the prevailing engagement face Fa of the engagement step section 223a is parallel to the back surface of the panel, and thus the engagement face Fa of the engagement step section 223a properly engages the panel 240.

Fourth Embodiment

A fourth embodiment will now be described with reference to FIGS. 15(a) to 15(c). The fourth embodiment is a modification of part of the third embodiment, and parts having substantially the same construction as those in the third embodiment are designated by like reference numerals, increased by 100 and are described only briefly, while describing the modified part in detail.

FIGS. 15(a) to 15(c) show a belt clamp. FIG. 15(a) is a front view, FIG. 15(b) is a partly broken-apart right side view, and FIG. 15(c) is a plan view. FIG. 16(a) is a sectional view showing the belt clamp, and FIG. 16(b) is a sectional view taken along line 16—16 in FIG. 16(a).

As shown in FIGS. 15(a) to 16(b), the belt clamp in this embodiment, like the third embodiment, mainly comprises a belt 310, a buckle 350 and a retaining leg 320.

The outer surface (i.e., back surface in the drawing) of the belt 310 has engagement teeth 311 and also ribs 312 formed on the opposite sides of the engagement teeth 311. The inner surface (i.e., front in the drawing) of the belt 310 has ribs 314 formed along the opposite edges. An end portion of the belt 310 has anti-slip protuberances 313.

As shown in FIG. 16(a), the buckle 350 to which the belt 310 is joined has a through hole 354 through which the belt 310 is inserted. An engagement piece 355 having two engagement protuberances 356 extends from the lower wall surface of the through hole 354. With elastic deformation of the engagement piece 355, the engagement protuberances 356 allow passage of the engagement teeth 311 when tightening the belt 310, but they block passage of the engagement teeth 311 in the reverse direction. The engagement piece 355 has an engagement release piece 357 at the free end thereof.

FIGS. 17(a) to 17(f) show the retaining leg 320 joined to the buckle 350. FIG. 17(a) is a partly broken-apart sectional view, FIG. 17(c) is a right side view, FIG. 17(d) is an enlarged-scale view showing an engagement step section, FIG. 17(e) is a view taken in the direction of arrow E in FIG. 17(d), FIG. 17(f) is a sectional view taken along line G—G in FIG. 17(a). As shown in FIGS. 17(a) to 17(c), the retaining leg 320 comprises a base 321 having a substantially circular shape in plan view, a pillar 322 depending from the base 321, and a pair of flexible retaining pieces 323 extending from the free end of the pillar 322 in a folded fashion toward the base 321. The base 321 has a substantially dish-like stabilizer 324 formed at the bottom thereof. The retaining leg 320 in this embodiment is attached in position in a truly circular mounting hole 341 of a panel 340 which will be described later.

As shown in FIGS. 17(d) and 17(e), the free end of each of the retaining pieces 323 has an engagement step section 323a having a plurality of (three in the drawing) steps. As best shown in FIG. 18(b) for describing the state of attachment of the retaining leg 320, the panel 340 for attaching the retaining leg 320 thereto has the truly circular mounting hole 341. FIG. 18(a) is a partly broken-away sectional view showing a state of engagement of the uppermost one of the steps of the engagement step section 323a, FIG. 18(b) is a sectional view taken along line 18—18 in FIG. 18(a), FIG. 18(c) is a partly broken-away sectional view showing a state of engagement of the intermediate one of the steps of the engagement step section 323a, and FIG. 18(d) is a partly broken-away front view showing a state of engagement of the lowermost one of the steps of the engagement step section 323a.

Referring to FIGS. 18(a) to 18(c), in the fourth embodiment, the engagement step sections 323a engage arcuate portions of the truly circular mounting hole 341 of the panel 340, and they are arcuate in the width direction of the retaining pieces 323.

As shown in FIG. 17(d), the angle θ between the engagement faces Fa and Fb of each engagement step section 323a is substantially 90°, like the third embodiment.

As shown in FIGS. 17(c) and 17(e), the retaining pieces 323 each have their end portion partly cut away lest they should interfere with a pertinent portion (shown at 320a) of the retaining leg 320.

As shown in FIGS. 18(a) to 18(d), each engagement face Fa of each engagement step section 323a, like the third embodiment, is formed such that it is parallel to the back surface of the panel 340 having a thickness t (see FIGS. 18(a) and 18(b)), t₁ (see FIG. 18(c)) or t₂ (see FIG. 18(d)), when the engagement step section 323a is in engagement with the mounting hole 341 of a fixed width W.

A case of binding an object (for instance, a wire harness) with the above belt clamp will now be described. As shown by double dot broken lines in FIGS. 15(a) and 15(b), the buckle 350 is held to face an object 330. Then, the belt 310 is wound on the object 330, and the end portion of the belt 310 is inserted through the through hole 354 so that it projects rearwardly of the buckle 350. Then, the end portion of the belt 310 is tightly bound by pulling the end portion of the belt 310 with fingers (see double dot broken lines in FIG. 16(a)).

Thereafter, the retaining leg 320 is inserted through the mounting hole 341 of the panel 340. As the retaining leg 320 is inserted through the mounting hole 341, the retaining pieces 323 are caused to flex toward each other by the mounting hole 341. When the base 321 comes to engage the panel 340, the retaining pieces 323 are elastically restored so that a step in each engagement step section 323a that corresponds to the thickness t, t₁ or t₂ of the panel 340 engages the mounting hole 341, so that the retaining leg 320 is attached and retained against detachment (see FIGS. 18(a) to 18(d)).

With the retaining leg 320 of the fourth embodiment, it is possible to obtain substantially the same effects as obtainable with the retaining leg 220 of the third embodiment.

The embodiments described above are by no means limitative, and changes and modifications may be made without departing from the scope of the invention. For example, the retaining legs 20, 120, 220 and 320 of the first to fourth embodiments may be integral with the clamp, clip or like or like associated component, or they may be fabricated separately and then made integral with the associated component.

Besides, the component retaining leg according to the invention can be adequately attached to a panel such that a step in each engagement step section that corresponds to the thickness of the panel engages the mounting hole. That is, a single retaining leg can be attached to any of a plurality of panels having different thicknesses, and time-consuming component management can be made unnecessary.

What is claimed:

1. A component retaining leg adapted to engage a panel through a mounting hole defined in the panel, the mounting hole having a peripheral edge, the panel having a first surface and an opposed substantially parallel second surface, said retaining leg comprising a base provided on a component, a pillar extending outward from said base and terminating in a free outer end, and a resiliently flexible retaining piece fixed to said free outer end of said pillar and extending inwardly therefrom at an angle to said pillar, said retaining piece terminating in a free inner end adjacent said base, said pillar and said retaining piece being adapted to engage through the panel hole with said base engaged with and substantially parallel to the front surface of the panel, said retaining piece being resiliently flexible toward said pillar upon engagement through the panel hole, said base limiting the extent of engagement through the hole by engaging the panel first surface, said free end of said retaining piece having an engagement step section for engaging the panel adjacent the hole peripheral edge, said engagement step section having a plurality of engagement steps formed at predetermined intervals therealong and selectively adapted to accommodate panels of different thicknesses, each of said engagement steps having an engagement face facing inward toward said base for selective engagement with the second surface of the panel upon engagement of said retaining leg through the mounting hole and engagement of said base with the first surface of the panel, said engagement faces of said engagement steps being formed at progressively greater angles to said pillar progressively outward from said inner free end of said retaining piece, each of said engagement faces assuming an angle substantially parallel to said base as said retaining piece is progressively flexed toward said pillar, thus providing for selective parallel engagement of said engagement faces with the second surface of the panel in accord with corresponding selected thicknesses of the panel.

2. The retaining leg of claim 1 wherein each of said engagement steps includes a second engagement face at substantially right angles to said first mentioned engagement face of the corresponding engagement step for simultaneous engagement with the panel second surface and with the peripheral edge of the panel opening.

* * * * *

UNITED STATES PATENT AND TRADEMARK OFFICE
CERTIFICATE OF CORRECTION

PATENT NO. : 5,669,731
DATED : September 23, 1997
INVENTOR(S) : KATSUHITO HIRONAKA ET AL It is certified that error appears in the above-indentified patent and that said Letters Patent is hereby corrected as shown below:

Column 10, line 35, change "front" to --first--.

Signed and Sealed this

Twenty-fourth Day of February, 1998

Attest:

BRUCE LEHMAN

*Attesting Officer*          *Commissioner of Patents and Trademarks*

REEXAMINATION CERTIFICATE (3902nd)

United States Patent
Hironaka et al.

[11] B1 5,669,731
[45] Certificate Issued Oct. 12, 1999

[54] COMPONENT RETAINING LEGS

[75] Inventors: Katsuhito Hironaka; Makoto Fukase, both of Okazaki, Japan

[73] Assignee: Daiwa Kasei Kogyo Kabushiki Kaisha, Okazaki, Japan

Reexamination Request:
No. 90/005,127, Oct. 29, 1998

Reexamination Certificate for:
Patent No.: 5,669,731
Issued: Sep. 23, 1997
Appl. No.: 08/619,793
Filed: Mar. 20, 1996

Certificate of Correction issued Feb. 24, 1998.

[30] Foreign Application Priority Data

Sep. 19, 1995 [JP] Japan .................... 7-239989

[51] Int. Cl.⁶ ...................... F16B 19/00
[52] U.S. Cl. ................. 403/397; 403/392; 411/508; 411/510; 24/297
[58] Field of Search .................. 403/397, 392, 403/384, 375, 105; 24/458, 297; 411/508, 509, 510, 913, 182

[56] References Cited

U.S. PATENT DOCUMENTS

| | | |
|---|---|---|
| 2,424,757 | 7/1947 | Klumpp, Jr. .................. 411/510 X |
| 3,794,278 | 2/1974 | Frey, Jr. et al. . |
| 4,080,522 | 3/1978 | Schimmels .................. 411/182 X |
| 4,431,355 | 2/1984 | Junemann .................... 411/508 X |
| 4,644,614 | 2/1987 | Mizusawa .................... 411/508 X |
| 4,712,341 | 12/1987 | Harris, Jr. et al. ............ 24/297 X |
| 4,787,795 | 11/1988 | Kraus ......................... 411/510 |
| 4,795,116 | 1/1989 | Kohut et al. . |
| 4,981,310 | 1/1991 | Belisaire . |
| 5,111,557 | 5/1992 | Baum et al. ................. 24/297 X |
| 5,289,621 | 3/1994 | Kaneko ....................... 24/297 X |

FOREIGN PATENT DOCUMENTS

| | | |
|---|---|---|
| 49-64660 | 9/1947 | Japan . |
| 57-166673 | 4/1956 | Japan . |
| 60-28613 | 2/1985 | Japan . |
| 1-71210 | 5/1989 | Japan . |
| 1-113609 | 7/1989 | Japan . |
| 2-097706 | 4/1990 | Japan . |
| 5-44709 | 6/1993 | Japan . |
| 5-223114 | 8/1993 | Japan . |
| 5-34329 | 8/1993 | Japan . |
| 5-96524 | 12/1993 | Japan . |
| 1340995 | 12/1973 | United Kingdom . |
| 2181179 | 4/1987 | United Kingdom . |
| 2289714 | 11/1995 | United Kingdom . |

*Primary Examiner*—Harry C. Kim

[57] ABSTRACT

A component retaining leg is disclosed, which comprises a base to be provided on a component such as a clamp and a clip, a pillar depending from the base, and a flexible retaining piece extending from the free end of the pillar in a folded fashion toward the base. The free end of the retaining piece has an engagement step section for engaging a mounting hole of a panel. The engagement step section has a plurality of engagement steps formed at a predetermined interval.

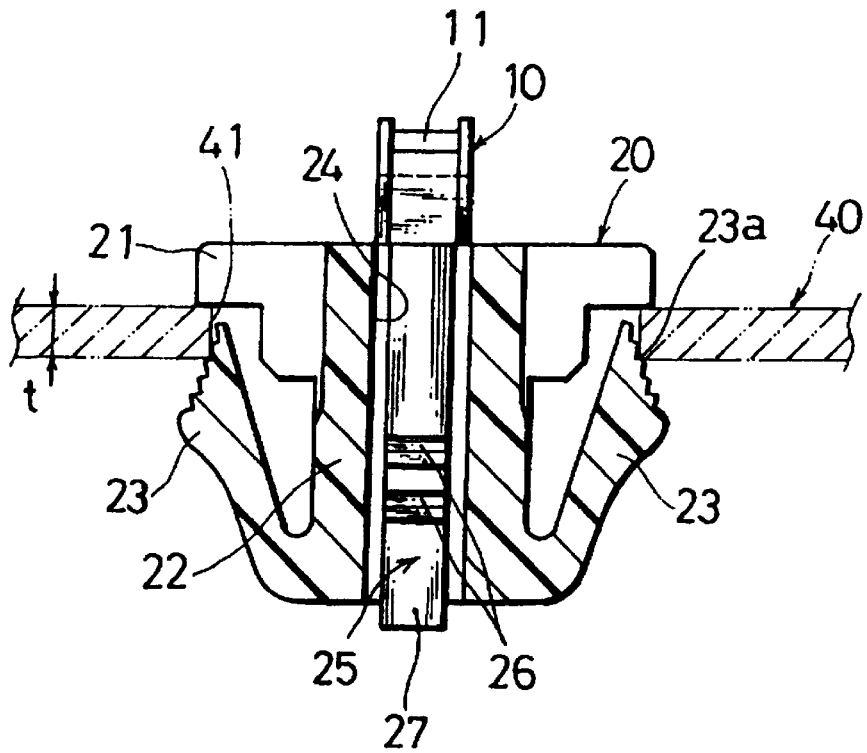

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–2 is confirmed.

* * * * *